July 18, 1961 R. A. ARTHUR 2,992,542
ICE FORMATION CONTROL FOR AIR CONDITIONING SYSTEMS
Filed Oct. 23, 1956
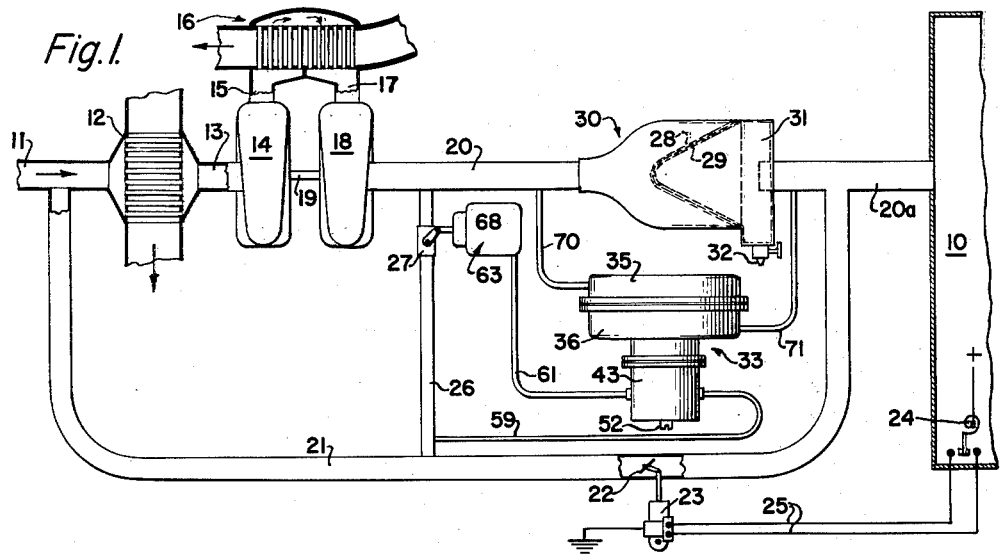
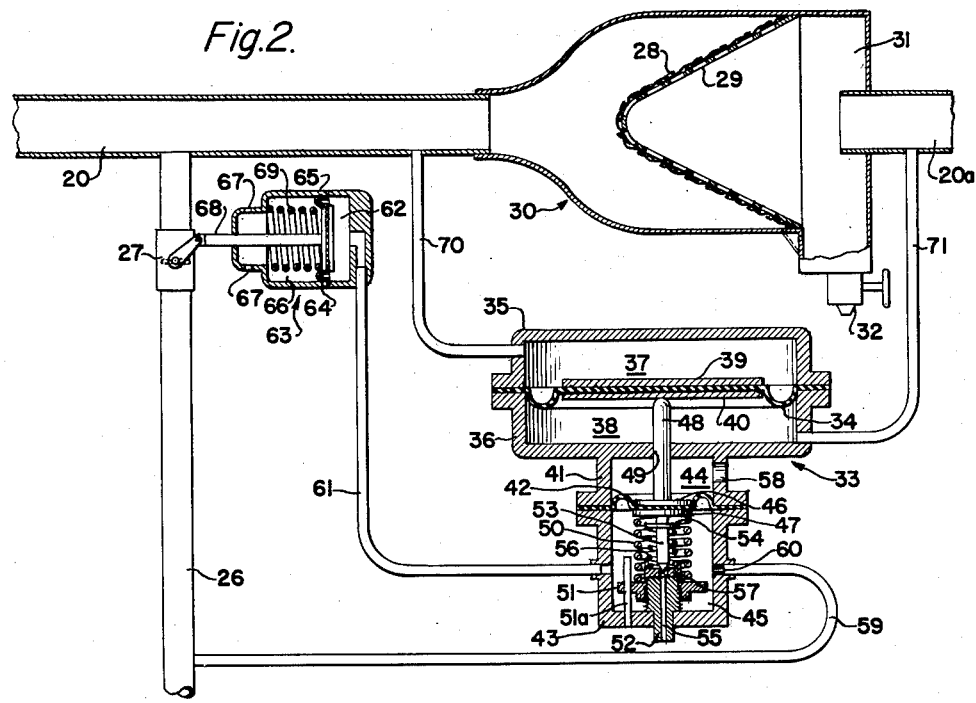
ROBERT A. ARTHUR,
INVENTOR.
BY John H. J. Wallace

United States Patent Office 2,992,542
Patented July 18, 1961

2,992,542
ICE FORMATION CONTROL FOR AIR CONDITIONING SYSTEMS
Robert A. Arthur, Palos Verdes Estates, Calif., assignor to The Garrett Corporation, Los Angeles, Calif., a corporation of California
Filed Oct. 23, 1956, Ser. No. 617,818
8 Claims. (Cl. 62—156)

This invention relates generally to an air conditioning system and more particularly to apparatus for controlling the formation of ice in the system.

The invention is described, for purposes of illustration, as utilized in an air cycle air conditioning system in an aircraft, wherein an expansion turbine is provided for cooling the conditioning air prior to its delivery to the aircraft compartment. In such systems the temperature of the air discharged from the expansion turbine is frequently so low that the moisture in the air is in the form of a fog composed of exceedingly fine ice particles or super-cooled droplets, or both. When the ice particles or super-cooled droplets impinge on the exposed internal surfaces of the conduit and equipment downstream of the turbine, ice accumulates or is formed on such surfaces thereby restricting the flow of air through the system and preventing proper operation.

It is an object of the invention to provide an air cycle air conditioning system having means for controlling the amount of ice accumulating on the exposed internal surfaces of the conduit and equipment downstream of the expansion turbine.

It is a further object of the invention to control the accumulation of ice in such an air conditioning system by providing means for controlling the temperature of the air downstream of the expansion turbine.

It is a still further object of the invention to provide an air cycle air conditioning system having valve means for introducing hot air into the air discharged from the expansion turbine to control the temperature of the discharged air.

It is still a further object of the invention to provide control means for an air cycle air conditioning system wherein the control means respond to changes in the pressure differential across a porous member located downstream of the expansion turbine to introduce hot air into the air discharged from the expansion turbine to control the amount of ice accumulating on the porous member.

Other and further objects of the invention will become apparent from the disclosure in the following detailed specification, appended claims, and accompanying drawing wherein:

FIG. 1 is a schematic representation of an air conditioning system utilizing the controls embodying the features of the invention.

FIG. 2 is an enlarged sectional view of the controls embodying the features of the invention.

Referring now to the drawing, there is shown in FIG. 1 a typical air cycle air conditioning system such as may be used in an aircraft for supplying conditioned air to an enclosure such as a pressurized compartment 10. The particular type of air conditioning system depicted in FIG. 1 is shown merely for purposes of illustrating the invention, and it is to be understood that the invention may be utilized in other types of air conditioning systems. The conditioning air is conducted through a duct 11 from a pressure source such as the compressor of a gas turbine engine, not shown, to a primary heat exchanger 12 wherein the conditioning air is brought into heat exchange relationship with a suitable coolant medium. The flow of air through the duct 11 may be controlled and regulated by sensing and responding devices, not shown, depending upon the requirements of the compartment of the airplane.

From the heat exchanger 12 the conditioning air is conducted through a duct 13 to a compressor 14 where the pressure of the air is further increased, and thence through a duct 15 to a secondary heat exchanger 16 wherein the conditioning air is again brought into heat exchange relationship with a suitable coolant medium. The cooled air from the secondary heat exchanger is conducted through a duct 17 into an expansion turbine 18 which extracts or absorbs work from the compressed air and thereby effects further cooling of the air. The work abstracted from the compressed air by the turbine 18 is delivered to the compressor 14 by a shaft 19 which connects the compressor and the expansion turbine.

The expended air from the turbine 18 is conducted through ducts 20 and 20a to the compartment 10. A bypass duct 21 is connected at its inlet end with the duct 11 upstream of heat exchanger 12 and at its outlet end with the duct 20a downstream of the air conditioning apparatus. Flow through the duct 21 is controlled by a valve 22 that may be modulated by an electrically energized actuator 23 in response to variations in compartment temperature. A thermostatic switch 24 is arranged to selectively energize conductors 25 of an actuator control circuit in response to temperature changes in compartment 10. A duct 26 connected at its one end with the bypass duct 21 upstream of the valve 22 and at its other end with the duct 20 adjacent the outlet of the expansion turbine 18, is provided with a valve 27 which may be actuated in the manner hereinafter described to introduce hot air from the duct 21 into duct 20.

The temperature of the air discharged from the expansion turbine 18 is frequently so low that the moisture in the air is in the form of a fog composed of exceedingly fine ice particles or super-cooled droplets, or both. When the ice particles or super-cooled droplets impinge on the exposed internal surfaces of the conduit and equipment downstream of the turbine, ice accumulates or is formed on the surfaces. The quantity of ice which accumulates in the duct and on the equipment downstream of the turbine is frequently so great that flow of air through the system is restricted and the operation of the system is impeded.

When an ice-collecting or accumulating means, such as a porous member, is inserted in the duct 20 downstream of the expansion turbine, any ice particles and/or super-cooled droplets which may be present in the air discharged from the expansion turbine will impinge on the porous member and ice will accumulate or form thereon. The change in pressure differential across the porous member due to the accumulating or forming of ice thereon may be utilized in the manner hereinafter disclosed to control the accumulation of ice in the system. The porous member may be a meshed fabric or porous cloth material, or may be merely a screen, a grid or grill, or a grizzly inserted in the duct 20. For the purposes of illustration, however, the porous member 28 is shown in the form of a condenser comprising a layer of fibreglass cloth maintained in postion by fastening means, not shown, on the perforated swirl producing conical body portion 29 of a water separator shown generally at 30. Normally the member 28 serves as a condenser and coalesces the fog and the exceedingly small droplets of entrained moisture in the fluid discharged from the expansion turbine into water droplets which are subsequently blown from the condenser and collected in a centrifugal collector section 31. However, when the fluid discharged from the expansion turbine contains ice particles, the porous member 28 serves as an ice collecting or accumulating means and ice accumulates or forms on the upstream face of the member. A valve drain 32 is provided in the collector section 31 to enable removal of the collected liquid. A more detailed description of the type of water separator referred to above may be found in U.S. Patent No. 2,823,760, issued to S. K. Andersen on February 18, 1958.

In operation, the fog and exceedingly small droplets of entrained moisture in the expansion turbine 18 are condensed or coalesced into water droplets on the porous fibreglass cloth 28 and are subsequently blown from the material. However, when the moisture in the air is in the form of ice particles and/or super-cooled droplets and flow through the porous member 28 is obstructed due to ice accumulating on the member, an increased pressure differential is set up across the member and hence across the water separator. The increased pressure differential, which may be termed a pressure signal, is ducted to a pressure differential control valve, shown generally at 33, that functions to supply high pressure air to actuate the valve 27 and introduce hot air into the duct 20, in the manner hereinafter described.

As shown primarily in FIG. 2, the pressure differential control valve 33 has a diaphragm 34 clamped at its outer periphery between a cover 35 and a housing 36 to form a chamber 37 and a chamber 38. A central portion of the diaphragm 34 is clamped between a pair of reinforcing plates 39 and 40 disposed on the upper and lower surfaces respectively of the diaphragm and fastened together by rivets, not shown, or any other well known means.

The housing 36 has a reduced diameter portion comprising a cylindrical wall 41 concentrically located on the underside of the housing, and a diaphragm 42 is clamped at its outer periphery between the lower end of the wall 41 and a housing 43 to form a chamber 44 and a chamber 45. A central portion of the diaphragm 42 is clamped between a pair of reinforcing plates 46 and 47 disposed on the upper and lower surfaces respectively of the diaphragm and fastened together by any means well known in the art.

A reciprocable pin 48, abutting at one end on the reinforcing plate 46, slidably protrudes through an aperture 49 in the housing 36 into operative engagement at its other end with the reinforcing plate 40. A spring 50 bearing between reinforcing plate 47 and a retainer 51 threaded onto an adjustable screw 52, may be utilized to urge the diaphragm 42 upwardly and retain the pin 48 in engagement with the reinforcing plate 40. It is to be understood, however, that the spring 50 may, for certain designs, be omitted or may be replaced by a spring located in chamber 38 and bearing between the housing 36 and the reinforcing plate 40. A pin 51a rigidly attached at one end to the housing 43 and slidably protruding through an aperture in the retainer 51, is provided to prevent the retainer from rotating.

A valve member 53 having an upper retainer 54 cooperates with a passage 55 in the screw 52 to control flow of air from the chamber 45 to a region of lower pressure, such as ambient atmosphere. The valve member 53 is urged upwardly into engagement with the reinforcing plate 47 by a spring 56 bearing between the upper retainer 54 and a lower retainer 57 mounted on the screw 52.

The chamber 44 of the control valve 33 is freely vented to ambient atmosphere through the orifice 58. The chamber 45 of the valve is connected to a source of high pressure air, such as the air in duct 26, by a pipe 59 and a restricted bleed orifice 60. The chamber 45 is also connected by a pipe 61 to an operating pressure chamber 62 of a pneumatic actuator 63 that is adapted to modulate the valve 27. The pneumatic actuator 63 may be of the type shown wherein a diaphragm 64 is marginally clamped in a housing 65 to form the operating pressure chamber 62 and a chamber 66 vented to ambient atmosphere by a plurality of orifices 67. The valve 27 may be of the butterfly type, or any other type suitable for the purpose, and may be connected to the diaphragm 64 by means of a lever assembly 68. The valve 27 is urged in the valve closing direction by a spring 69 bearing between the housing 65 and the diaphragm 64.

Chamber 37 of the pressure differential control valve 33 is connected by a pipe 70 with duct 20 upstream of the porous member 28, and chamber 38 is connected by pipe 71 with duct 20a downstream of the porous member. Thus, the diaphragm 34 senses the pressure drop across the porous member.

In operation, the valve 33 is preset to prevent the sensing of a pressure drop across the porous member 28 when no ice is present on the porous member and the pressure drop across it is due only to flow through it and the conical body portion 29. The valve member 53, at this time, is held in the open position and the high pressure air flowing into chamber 45 through the restricted orifice 60 exhausts freely to ambient atmosphere through the passage 55 so that the pressure in chamber 45, and the interconnected operating chamber 62, is essentially the same as ambient atmosphere. Since the chamber 66 freely communicates with ambient atmosphere through orifices 67, both sides of the diaphragm 64 will, therefore, be subjected to ambient atmospheric pressure and the force of the spring 69 acting upon the diaphragm will hold the valve 27 in the closed position.

When ice accumulates or forms on the porous member and flow through the member is accordingly obstructed, the pressure of the air in the duct 20 upstream of the porous member and the water separator 30 will increase. The pressure of the air in the duct 20a downstream of the porous member and the water separator meantime is controlled by the pressure regulating mechanism, not shown, in compartment 10 and will remain substantially constant, or change very slowly, in accordance with the requirements of the regulating mechanism. Thus, the pressure differential across the porous member will increase and, since the pressures in ducts 20 and 20a are transmitted through ducts 70 and 71 to chambers 37 and 38, respectively, the diaphragm 34 will be subjected to a corresponding increase in pressure differential which will cause a downward movement of the diaphragm.

When the diaphragm 34 is moved downwardly, the pin 48, diaphragm 42 and valve member 53 are also moved downwardly to partially close the passage 55 so that flow of high pressure air from the chamber 45 through passage 55 is restricted and the pressure in chamber 45, and the interconnected chamber 62, is increased. The increased pressure in chamber 62 acting on the diaphragm 64 tends to move the diaphragm 64 to the left, as shown in the drawing, and open the valve 27 to permit hot air in duct 26 to enter the duct 20 from duct 21 and raise the temperature of air in the duct. Raising the temperature of the air in duct 20 tends to melt the ice on the inner wall of the duct and on the porous member 28.

The melting of the ice on the porous member decreases the pressure drop across it and the water separator and the resultant decreased pressure differential acting across diaphragm 34 tends to move the diaphragm in the upward direction. When the diaphragm 34 is moved upwardly, the diaphragm 42 and the pin 48 are urged upwardly by the force of the spring 50 to follow the movement of the diaphragm 34. The valve member 53, held in engagement with the diaphragm 42 by the spring 56, will move upwardly with the diaphragm 42 to permit additional high pressure air to flow from chamber 45 through passage 55 to atmosphere and thus reduce the pressure in chamber 45. Reducing the pressure in chamber 45 likewise reduces the pressure in the operating chamber 62 thereby permitting the spring 69 to move the diaphragm 64 to the right, as shown in the drawing, and move the valve 27 toward the closed position. Modulation of the valve 27 in this manner will tend to maintain the temperature of the air in the duct 20 at approximately 32° F., or at the dew point in the duct, whichever is lower, and thus control the formation of ice on the porous member 28.

The pressure in chamber 45, and the interconnected chamber 62, is thus controlled by bleeding high pressure air into the chamber 45 through the restricted orifice 60 and metering the escape of air from the chamber by modulating the flow through passage 55 in accordance with the pressure differential across the diaphragm 34. The pressure in chambers 45 and 62 will, therefore, always be at a value as determined by the differential pressure across the diaphragm 34 for any given spring and ratio of diaphragm areas. The balancing of the forces may be represented mathematically by the equation:

$$(P_{45}-P_{44})A_S + K = (P_{37}-P_{38})A_L$$

where $P_{45}$ and $P_{44}$ represent the pressure of the air in chambers 45 and 44 respectively; $A_S$ is the effective area of the small diaphragm 42; K represents the combined spring force of the springs 50 and 56; $P_{37}$ and $P_{38}$ represent the pressure of the air in chambers 37 and 38 respectively; and $A_L$ is the effective area of the large diaphragm 34.

It can readily be seen from the above equation that, due to the relatively large difference between the area of the small diaphragm 42 and the area of the large diaphragm 34, only a small change in pressure differential across the diaphragm 34, and thus across the porous member 28, is required to actuate the valve member 53. Once the operating pressure required to initially open the valve 27 and the operating pressure required to fully open the valve 27 is known, the ratio of the areas of diaphragm 34 and diaphragm 42, and the pressure differential across diaphragm 34 required to supply the operating pressures, can be determined. When the pressure differential across the diaphragm 34 is within the determined values, the valve 27 will be modulated, as explained above, to control the temperature of the air in duct 20 and thereby control the accumulation of ice on the porous member.

While the invention is described as utilized for controlling the formation of ice in an air cycle air conditioning system, it is to be understood that its utility is not limited thereto since it may be utilized in other types of air conditioning systems, and in many other applications, as will be apparent to those skilled in the art.

I claim:

1. In an air conditioning system adapted for connection to a source of high pressure air and including an expansion turbine: first duct means for conducting discharge air from said expansion turbine to an enclosure; ice accumulating means comprising a porous member disposed in said first duct means; second duct means for supplying hot air to said first duct means upstream of said porous member; a valve member in said second duct means; pneumatic means for modulating said valve member when ice accumulates on said porous member, said pneumatic means having an operating pressure chamber; inlet passage means for connecting the operating pressure chamber with a source of fluid pressure; outlet passage means for connecting the operating pressure chamber with a region of lower pressure; a valve member for controlling the escape of fluid through said outlet passage means; and a differential pressure control valve having a first pressure responsive element exposed on one side to pressure upstream of said porous member and on the opposite side to pressure downstream of said porous member and a second pressure responsive element exposed on one side to ambient atmospheric pressure and on the opposite side to the pressure in said operating pressure chamber, said first pressure responsive element and said second pressure responsive element being operatively connected for operating said valve member.

2. A differential pressure control valve for sensing variations in the differential between a high fluid pressure and a low fluid pressure and regulating pressure of fluid in an operating pressure chamber in response to said variations comprising: a first pressure responsive element sensitive to the differential between said high and low fluid pressures; a second pressure responsive element sensitive to the differential between ambient atmospheric pressure and pressure in said operating pressure chamber; means operatively connecting said first and second pressure responsive elements; passage means for connecting said operating pressure chamber with a source of fluid pressure; and valve means attached to and operable by movement of said second pressure responsive element for regulating pressure of the fluid in said operating pressure chamber.

3. A differential pressure control valve for sensing variations in the differential between a high fluid pressure and a low fluid pressure and regulating pressure of fluid in an operating pressure chamber in response to said variations comprising: a first pressure responsive element sensitive to the differential between said high and low fluid pressures; a second pressure responsive element sensitive to the differential between ambient atmospheric pressure and pressure in said operating pressure chamber; means operatively connecting said first and second pressure responsive elements; inlet passage means for connecting said operating pressure chamber with a source of fluid pressure; outlet passage means for connecting said operating pressure chamber with a region of lower pressure; and valve means attached to and operable by movement of said second pressure responsive element for controlling one of said passage means to regulate pressure of the fluid in said operating pressure chamber.

4. A differential pressure control valve for sensing variations in the differential between a high fluid pressure and a low fluid pressure and regulating pressure of fluid in an operating pressure chamber in response to said variations comprising: a first pressure responsive element sensitive to the differential between said high and low fluid pressures; a second pressure responsive element sensitive to the differential between ambient atmospheric pressure and pressure in said operating pressure chamber; means operatively connecting said first and second pressure responsive elements; inlet passage means including a restricted bleed orifice for connecting said operating pressure chamber with a source of fluid pressure; outlet passage means for connecting said operating pressure chamber with a region of lower pressure; and valve means attached to and operable by movement of said second pressure responsive element for controlling the escape of air through said outlet passage means to regulate pressure of the fluid in said operating pressure chamber.

5. In an air conditioning system having means for cooling air to be conditioned: conduit means for conducting conditioned air from said cooling means to an enclosure; ice accumulating means in said conduit means; first duct means for supplying hot air to said conduit means; first valve means in said first duct means; means responsive to the pressure drop across said ice accumulating means for modulating said first valve means when ice accumulates on said ice accumulating means; second duct means for supplying hot air to said conduit means; second valve means in said second duct means; and means for modulating said second valve means in response to enclosure temperature variations.

6. In an air conditioning system having means for cooling air to be conditioned: conduit means for conducting conditioned air from said cooling means to an enclosure; ice accumulating means in said conduit means; first duct means for supplying hot air to said conduit means upstream of said ice accumulating means; first valve means in said first duct means; means responsive to the pressure drop across said ice accumulating means for modulating said first valve means when ice accumulates on said ice accumulating means; second duct means for supplying hot air to said conduit means downstream of said ice accumulating means; second valve means in said second duct means; and means for modulating said second valve means in response to enclosure temperature variations.

7. A differential pressure control valve for sensing variations between a first and a second fluid pressure and regulating the pressure of a fluid in an operating pressure chamber in response to said variations comprising: a first pressure responsive element exposed on its upper surface to said first fluid pressure and on its lower surface to said second fluid pressure; a second pressure responsive element exposed on its upper surface to ambient atmospheric pressure and on its lower surface to the pressure in said operating pressure chamber; means operatively connecting said first and second pressure responsive elements; passage means for connecting said operating pressure chamber with a source of fluid pressure; and valve means attached to and operable by movement of said pressure responsive elements for increasing the pressure of the fluid in said operating pressure chamber when the pressure differential across said first pressure responsive element moves said element toward said operating pressure chamber.

8. A differential pressure control valve for sensing variations between a first and a second fluid pressure and regulating the pressure of a fluid in an operating pressure chamber in response to said variations comprising: a first pressure responsive element exposed on its upper surface to said first fluid pressure and on its lower surface to said second fluid pressure; a second pressure responsive element exposed on its upper surface to ambient atmospheric pressure and on its lower surface to the pressure in said operating pressure chamber; means operatively connecting said first and second pressure responsive elements; inlet passage means including a restricted bleed orifice for connecting said operating pressure chamber with a source of fluid pressure; outlet passage means for connecting said operating pressure chamber with a region of lower pressure; and valve means attached to and operable by movement of said pressure responsive elements for controlling the escape of fluid through said outlet passage means, said valve means being adapted to be moved toward a closed position to increase the pressure in said operating pressure chamber when the differential between the pressure of said first fluid and the pressure of said second fluid moves said first pressure responsive element toward said operating pressure chamber.

References Cited in the file of this patent
UNITED STATES PATENTS

| | | |
|---|---|---|
| 2,207,921 | Huxford | July 16, 1940 |
| 2,454,946 | Rosenberger | Nov. 30, 1948 |
| 2,484,850 | Paget | Oct. 18, 1949 |
| 2,485,522 | Andersen | Oct. 18, 1949 |
| 2,505,201 | Peterson | Apr. 25, 1950 |
| 2,566,617 | Lehane | Sept. 14, 1951 |
| 2,618,125 | Fischer | Nov. 18, 1952 |
| 2,622,406 | Scofield | Dec. 23, 1952 |
| 2,628,481 | Scofield | Feb. 17, 1953 |
| 2,697,917 | Mayer | Dec. 28, 1954 |
| 2,767,725 | Long | Oct. 23, 1956 |
| 2,781,770 | Sutton | Feb. 19, 1957 |
| 2,829,505 | Oates | Apr. 18, 1958 |

FOREIGN PATENTS

| | | |
|---|---|---|
| 1,111,141 | France | Oct. 26, 1955 |

OTHER REFERENCES

Ser. No. 362,699, Wunsch (A.P.C.), published May 11, 1943.